United States Patent
Ida et al.

(10) Patent No.: US 11,402,932 B2
(45) Date of Patent: Aug. 2, 2022

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Kentaro Ida, Tokyo (JP); Yuri Kusakabe, Tokyo (JP); Takuya Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 16/956,161

(22) PCT Filed: Sep. 25, 2018

(86) PCT No.: PCT/JP2018/035490
§ 371 (c)(1),
(2) Date: Jun. 19, 2020

(87) PCT Pub. No.: WO2019/130696
PCT Pub. Date: Jul. 4, 2019

(65) Prior Publication Data
US 2021/0117015 A1    Apr. 22, 2021

(30) Foreign Application Priority Data
Dec. 27, 2017 (JP) ................. JP2017-250391

(51) Int. Cl.
*G06F 3/038* (2013.01)
*G06T 7/70* (2017.01)
*G06F 3/0354* (2013.01)

(52) U.S. Cl.
CPC .......... *G06F 3/0386* (2013.01); *G06F 3/0383* (2013.01); *G06F 3/03542* (2013.01); *G06T 7/70* (2017.01); *G06F 2203/0382* (2013.01); *G06F 2203/0384* (2013.01)

(58) Field of Classification Search
CPC ................................. G06F 3/0386; G06T 7/70
USPC .......................................................... 345/179
See application file for complete search history.

(56) References Cited

U.S. PATENT DOCUMENTS

2013/0307772 A1* 11/2013 Wu .................. G06F 3/0386
                                                                   345/158
2019/0246253 A1*  8/2019 Ryu ................. H04W 4/90
2020/0404077 A1* 12/2020 Jiang ............... G06F 16/9035

FOREIGN PATENT DOCUMENTS

| GB | 2508840 A     | 6/2014  |
|----|---------------|---------|
| JP | 2006-189706 A | 7/2006  |
| JP | 2008-077168 A | 4/2008  |
| JP | 2014-230034 A | 12/2014 |

(Continued)

*Primary Examiner* — Calvin C Ma
(74) *Attorney, Agent, or Firm* — Paratus Law Group, PLLC

(57) ABSTRACT

There is provided an information processing device enabling reduction in cost and identification of input devices, the information processing device including: a light emission control unit that performs control such that a first light emission instruction is output to a first input device, if first identification information has been received from the first input device; and a processing unit that associates first light emission position information with the first identification information, if the first light emission position information has been acquired, the first light emission position information indicating a position where light has been emitted by a first light emission unit of the first input device.

20 Claims, 16 Drawing Sheets

(56) References Cited

FOREIGN PATENT DOCUMENTS

| JP | 2016-018455 A | 2/2016 |
| JP | 2016-066521 A | 4/2016 |
| JP | 2017-098268 A | 6/2017 |
| JP | 2018-132799 A | 8/2018 |

* cited by examiner

| BT: AAA: SW: on | DONE |
|---|---|
| → BT: BBB: SW: on | IN PROGRESS |
| BT: CCC: SW: on | WAITING |
| BT: AAA: SW: off | WAITING |
| BT: DDD: SW: on | WAITING |

FIRST PEN
BT: AAA
[S3]
~
[S4] Success

SECOND PEN
BT: BBB
[S3]
~
[S5] Failed t

FIG.9

| | [S3] DETECTING | [S4] PAIRING | [S6] LOST | [S1] INDEFINITE STATE |
|---|---|---|---|---|
| BLINKING REPRESENTATION | HIGH-SPEED BLINKING (BLINK-BLINK) | TURNED ON | LOW SPEED BLINKING (BLINK) | TURNED OFF |
| COLOR REPRESENTATION | WHITE COLOR | GREEN COLOR | RED COLOR | YELLOW COLOR |

US 11,402,932 B2

INFORMATION PROCESSING DEVICE, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2018/035490 (filed on Sep. 25, 2018) under 35 U.S.C. § 371, which claims priority to Japanese Patent Application No. 2017-250391 (filed on Dec. 27, 2017), which are all hereby incorporated by reference in their entirety.

FIELD

The present disclosure relates to an information processing device, an information processing method, and an information processing system.

BACKGROUND

Techniques for making an input by using a pen, which is an example of an input device, have been known in recent years. For example, there may be a case where plural pens are used. Known as a technique for distinguishing among plural pens is a technique in which plural pens are distinguished from one another according to wavelengths of IR detected by causing infrared light emitting diodes (IR LEDs) for locus detection provided respectively in the plural pens to emit light of different wavelengths. However, according to this technique, identifying two pens that emit IR light of the same wavelength is difficult.

Furthermore, pens are not necessarily identified, and disclosed is a technique for controlling, only when plural pens are used at the same time, light emission of an IR LED provided in each pen by transmitting control signals individually to the pens from a system for identifying each of the plural pens (as seen in, for example, Patent Literature 1). According to this technique, a problem is solved, the problem being that in a case where light is emitted from a coordinate set A and a coordinate set B at the same time and the light from the coordinate sets A and B is matched to light of a pen A by use of two sensors, the light therefrom may be matched to a false coordinate set A' and a false coordinate set B' that do not actually exist.

CITATION LIST

Patent Literature

Patent Literature 1: JP 2016-18455 A

SUMMARY

Technical Problem

However, according to this technique, functions specific to each pen (for example, color, thickness, and patchiness, of its locus) are unable to be assigned to the pen. Furthermore, even if pens that are able to be identified individually are used, pens that are different from one another in a hardware aspect need to be prepared for those functions, and much cost is required for the preparation of the pens. Therefore, a technique that enables reduction in cost and identification of input devices is desired to be provided.

Solution to Problem

According to the present disclosure, an information processing device is provided that includes: a light emission control unit that performs control such that a first light emission instruction is output to a first input device if first identification information has been received from the first input device; and a processing unit that associates first light emission position information indicating a position where light has been emitted by a first light emission unit of the first input device, with the first identification information, if the first light emission position information has been acquired.

According to the present disclosure, an information processing method is provided that includes: controlling such that a first light emission instruction is output to a first input device, if first identification information has been received from the first input device; and associating, by using a processor, first light emission position information with the first identification information, if the first light emission position information has been acquired, the first light emission position information indicating a position where light has been emitted by a first light emission unit of the first input device.

According to the present disclosure, an information processing system is provided that having an input device and an information processing device, wherein the input device comprises a control unit that performs control of transmission of identification information, the control unit performs control such that a light emission unit emits light if a light emission instruction has been received from the input device, and the information processing device comprises: a light emission control unit that performs control such that the light emission instruction is output, if the identification information has been received; and a processing unit that associates light emission position information with the identification information, if the light emission position information has been acquired, the light emission position information indicating a position where light has been emitted by the light emission unit.

Advantageous Effects of Invention

As described above, according to the present disclosure, a technique that enables reduction in cost and identification of input devices is provided. This effect is not necessarily limiting, and together with the effect, or instead of the effect, any of effects disclosed in this specification or any other effect that is able to be perceived from this specification may be achieved.

BRIEF DESCRIPTION OF DRAWINGS

FIG. 9 is a diagram illustrating an example of presentation of pairing states.

DESCRIPTION OF EMBODIMENTS

A preferred embodiment of the present disclosure will hereinafter be described in detail, while reference is made to the appended drawings. Redundant explanation will be omitted by assignment of the same reference sign to components having substantially the same functional configuration, throughout this specification and the drawings.

Furthermore, plural components having substantially the same functional configuration may be distinguished from one another by addition of different numbers after the same reference sign, throughout the specification and drawings. However, if plural components having substantially the same functional configuration do not need to be particularly distinguished from one another, only the same reference sign will be assigned to these components. In addition, plural components having the same functional configuration or similar functional configurations may be distinguished from one another by addition of different alphabets after the same reference sign. However, if plural components having the same functional configuration or similar functional configurations do not need to be particularly distinguished from one another, only the same reference sign will be assigned to these components.

Description will be made in the following order.
0. Outline
1. Details of Embodiment
1.1. Example of System Configuration
1.2. Details of Pairing Operation
1.3. Various Modified Examples
1.4. Effects
1.5. Examples of Extended Function
1-6. Application Examples
1.7. Examples of Hardware Configuration
2. Conclusion

0. OUTLINE

In recent years, input by use of digital pens has been supported for interactive projectors sold by organizations. However, techniques for identifying plural pens in a situation where the plural pens are being used at the same time differ among these organizations. For example, by individual recognition of plural pens: information related to handwriting with each pen (for example, being pencil-like, being writing-brush-like, or being painting-brush-like, and/or thickness of its locus) may be reflected in the handwriting with the pen; color of the handwriting may be changed; or assigned writable security levels may be associated with hardware of the pens, like in an example where writing with a teacher's pen is enabled while writing with a student's pen is disabled.

Proposed as a technique for identifying pens according to the embodiment of the present disclosure is a technique enabling identification of an infinite number of pens in principle by sequential recognition of pens through use of a communication function (according to, for example, Bluetooth (registered trademark), which may hereinafter be simply referred to as "BT") and an on/off control function for infrared light LEDs for pen tip detection. Described hereinafter is a main identification procedure by use of a technique for identifying pens according to the embodiment of the present disclosure.

Figure 1:
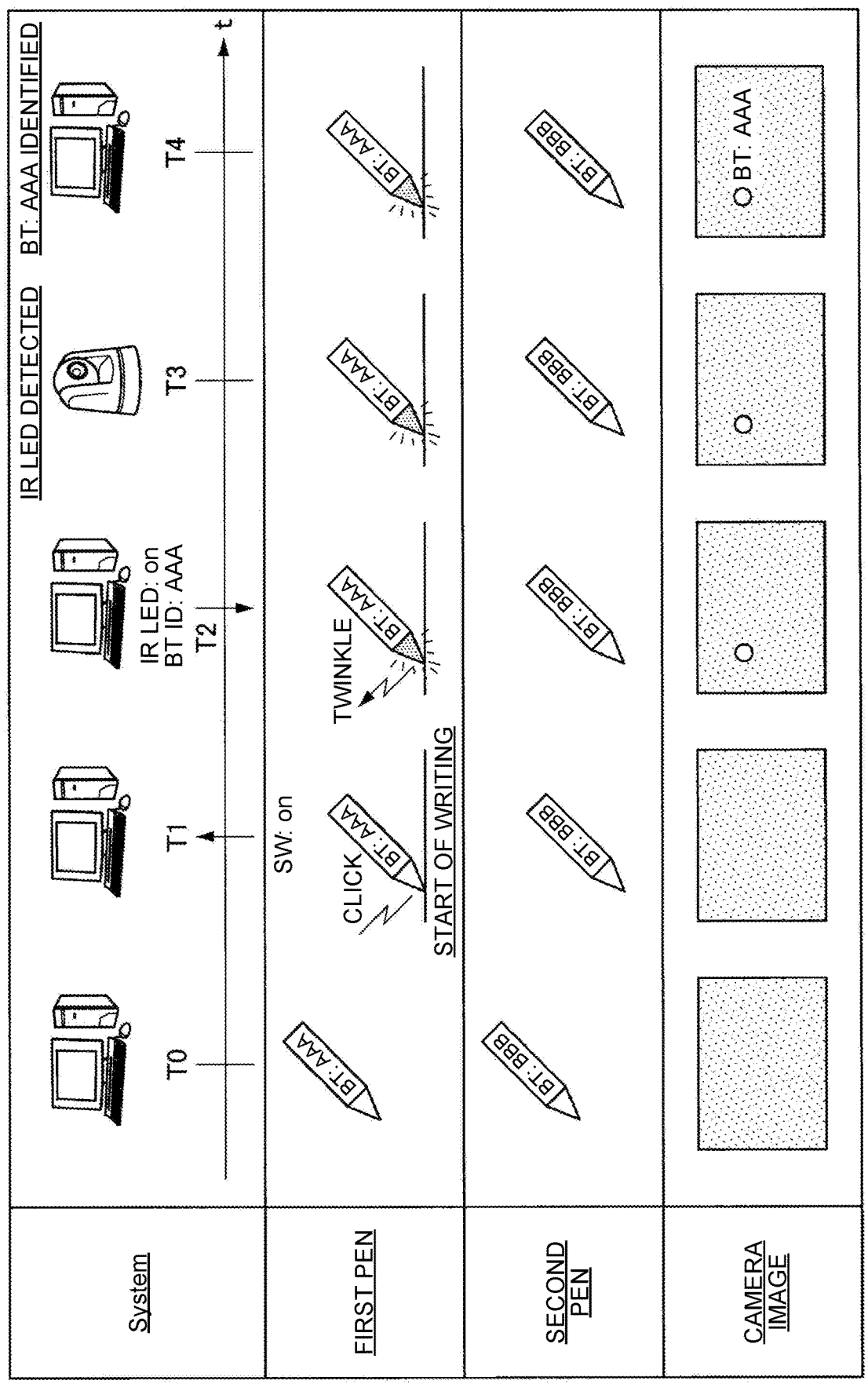
FIG. 1 is a diagram illustrating a flow of processing where a system according to an embodiment of the present disclosure identifies pens.

FIG. 1 is a diagram illustrating a flow of processing where a system according to the embodiment of the present disclosure identifies pens. A case where two pens (a first pen and a second pen) are present as illustrated in FIG. 1 will be supposed (time T0). Identification information has been stored in each of these two pens. A case where a BT ID is used as an example of the identification information will be supposed. Specifically, in the example illustrated in FIG. 1, the BT ID of the first pen is "AAA" and the BT ID of the second pen is "BBB".

When writing is started with the first pen (time T1), a switch at a pen tip end of the first pen is turned on, and through a communication function (according to, for example, BT), information (including the BT ID, "AAA") is transmitted from the first pent to the system. The system acquires the BT ID, "AAA", of the first pen from the information transmitted from the first pen, and transmits a request for turning on an IR LED to the first pen through communication using the BT ID, "AAA". As a result, when the first pen receives the request for turning on the IR LED, the first pen turns the IR LED on, and IR light emitted from a pen tip of the first pen is detected in a camera image (time T2).

The system associates a detected bright point (a light emission position) due to the IR LED with the information (including the BT ID, "AAA") received from the first pen in the communication, and stores them as first pen information. Thereafter, the system is able to handle the bright point due to the IR LED detected by a camera, the information received from the first pen (including the BT ID, "AAA", that is, identification information on hardware of the first pen), and functions of the pen managed by an application of the system (such as color, thickness, and patchiness of the pen's locus) in association with one another.

Figure 2:
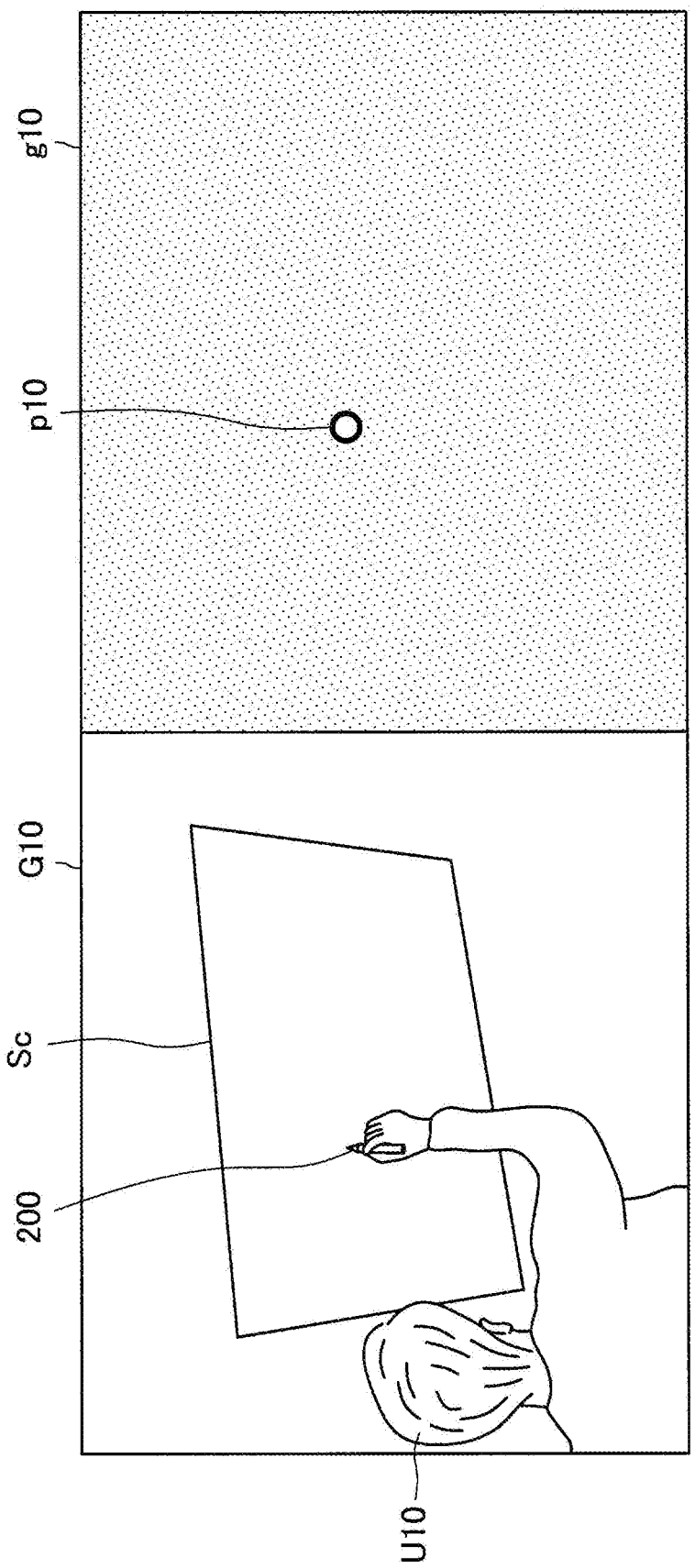
FIG. 2 is a diagram illustrating an example of each of a visible light image and an infrared light image of a screen written with a pen.

FIG. 2 is a diagram illustrating an example of each of a visible light image and an infrared light image of a screen written with a pen. As illustrated in FIG. 2, a visible light image G10 is an image captured by a visible light camera and the visible light image G10 has, captured thereon, a screen Sc, a user U10, and an input device 200 that the user U10 is using for writing on the screen Sc. An infrared light image g10, on the other hand, is an image captured by an infrared light camera, and the infrared light image g10 has, captured thereon, a bright point p10 of IR light emitted by the input device 200.

For example, an information processing device that performs overall control can understand the environment only from images through a camera. For example, the information processing device identifies a pen that is emitting IR light by capturing the bright point p10 from the infrared light image g10. In contrast, identification of which pen is emitting light by use of vision of a human is difficult. Therefore, proposed according to the embodiment of the present disclosure is a technique for enabling individual identification of plural pens having the same structure (an infinite number of pens in principle) and reflection of functions assigned to each pen in handwriting with the pen by using such an imaging technique with a camera in combination with a communication function.

1. DETAILS OF EMBODIMENT

1.1. Example of System Configuration

Figure 3:
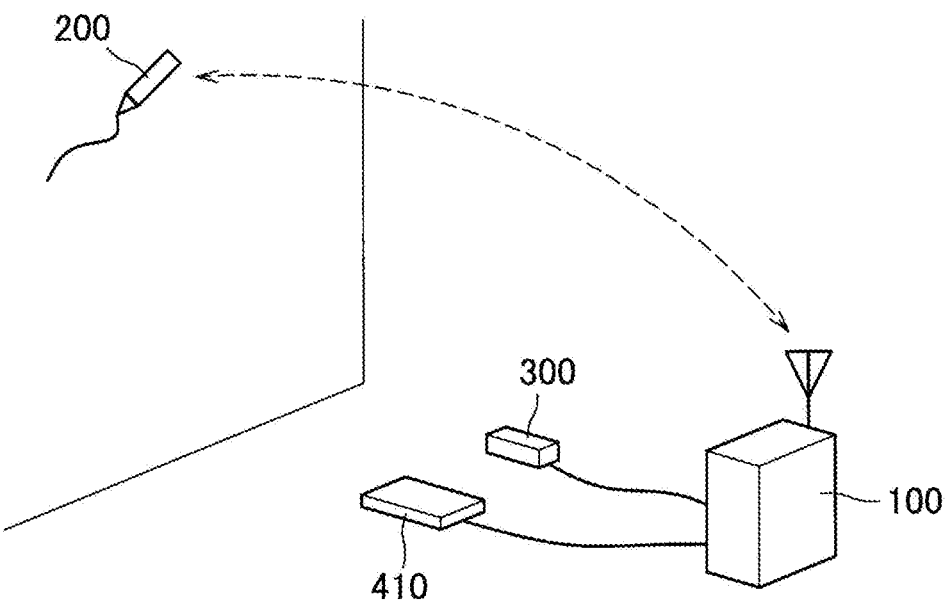
FIG. 3 is a diagram of a schematic configuration of an information processing system according to the embodiment of the present disclosure.

Described next while reference is made to FIG. 3 is an example of a configuration of an information processing system 1 according to the embodiment of the present disclosure. FIG. 3 is a diagram of a schematic configuration of the information processing system 1 according to the embodiment of the present disclosure. As illustrated in FIG. 3, the information processing system 1 includes an information processing device 100, the input device 200, a camera 300, and a projector 410 that is an example of an output device. In the example illustrated in FIG. 3, the camera 300 and the projector 410 are installed on a floor surface, but positions where the camera 300 and the projector 410 are installed are not limited (and the camera 300 and the projector 410 may be installed higher than the floor surface).

Figure 4:
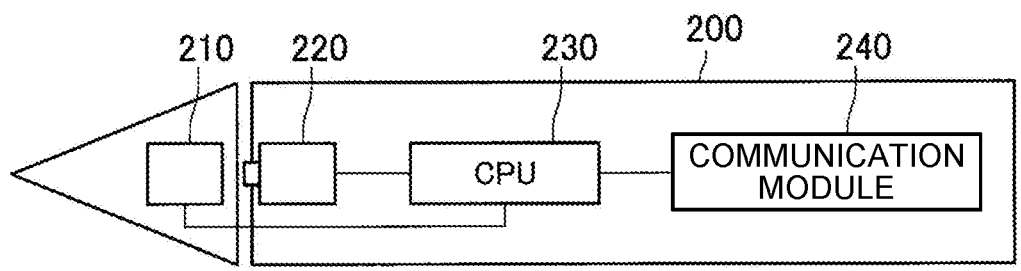
FIG. 4 is a diagram illustrating an example of a functional configuration of an input device.

FIG. 4 is a diagram illustrating an example of a functional configuration of the input device 200. As illustrated in FIG. 4, according to the embodiment of the present disclosure, a case where a pen (a pen-type input device) is used as an example of the input device 200 will be supposed mainly. However, the input device 200 according to the embodiment of the present disclosure is not limited to the pen (the pen-type input device).

As illustrated in FIG. 4, the input device 200 includes: an IR LED 210 that is an example of a light emission unit used in detection of handwriting; a pen tip switch 220 that is an example of a detection unit that detects an input state; a central processing unit (CPU) that is an example of a control unit that performs control of the overall operation of the input device 200; and a communication module 240 that is an example of a communication unit that performs communication with the information processing device 100.

Figure 5:
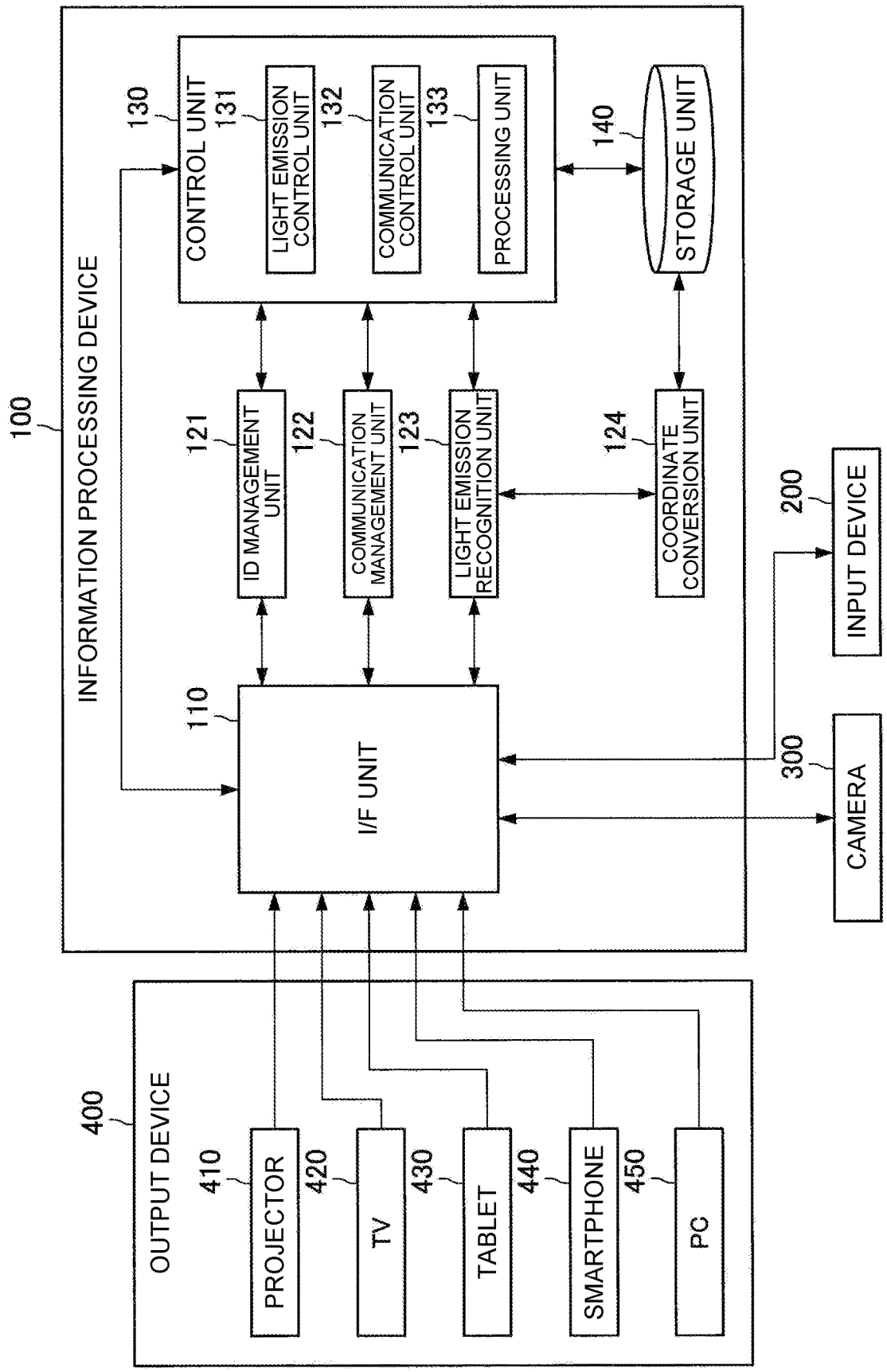
FIG. 5 is a diagram illustrating an example of a functional configuration of the information processing system according to the embodiment of the present disclosure.

FIG. 5 is a diagram illustrating an example of a functional configuration of the information processing system 1 according to the embodiment of the present disclosure. As illustrated in FIG. 5, the information processing system 1 includes the information processing device 100, the input device 200, the camera 300, and an output device 400.

The camera 300 has a function of detecting a light emission position (an IR bright point) by the IR LED of the input device 200 (pen). A case where the camera 300 includes an infrared light camera will be supposed herein. An IR bright point detected by the camera 300 is associated with a BT ID of the input device 200 (pen). Or, the IR bright point detected by the camera 300 may be used as a locus (handwriting) of the input device 200 (pen).

The information processing device 100 includes an I/F unit 110. The I/F unit 110 may function as a communication module that performs communication with the input device 200. This communication module performs reception of on/off notification for the pen tip switch, transmission of on/off notification for the IR LED, and the like, upon association (hereinafter, also simply referred to as "pairing") between the IR bright point detected by the camera 300 and the BT ID of the input device 200 (pen). Mainly supposed according to the embodiment of the present disclosure is a case where wireless communication according to BT is performed with the input device 200 by the communication module. However, the communication module may perform communication with the input device 200 by wired communication.

Furthermore, the information processing device 100 has an ID management unit 121, a communication management unit 122, a light emission recognition unit 123, a coordinate conversion unit 124, and a control unit 130. The ID management unit 121, the communication management unit 122, the light emission recognition unit 123, the coordinate conversion unit 124, and the control unit 130 may be formed of a processing device, for example, a central processing unit (CPU). If the control unit is formed of a processing device, such as a CPU, the processing device may be formed of an electronic circuit.

The ID management unit 121 manages the specific ID (the BT ID) of the input device 200 (pen) acquired from the input device 200 by a communication control unit 132 via the I/F unit 110. That is, the ID management unit 121 manages the specific ID (BT ID) of the input device 200 (pen) that has been recognized up to the present. The communication management unit 122 manages communication device information (for example, information indicating that the BT ID of the first pen is "AAA" and the BT ID of the second pen is "BBB") on input devices 200 (pens).

The light emission recognition unit 123 recognizes a bright point of an IR LED from an image (for example, an infrared light image) captured by the camera 300. The coordinate conversion unit 124 converts the bright point recognized by the light emission recognition unit 123, from a camera coordinate system to a screen coordinate system. The storage unit 140 stores information associating between the BT ID of each input device 200 (pen) and the IR bright point (information indicating the light emission position of the IR LED).

The control unit 130 has a light emission control unit 131, the communication control unit 132, and a processing unit 133. The light emission control unit 131 performs light emission control for the IR LED (transmission control of on/off notification for the IR LED) upon association between the IR bright point detected by the camera 300 and the BT ID of the input device 200 (pen). The communication control unit 132 performs control of reception of on/off notification of the pen tip switch upon association between the IR bright point detected by the camera 300 and the BT ID of the input device 200 (pen). The processing unit 133 causes the storage unit 140 to store the IR bright point detected by the camera 300 in association with the BT ID of the input device 200 (pen).

The input device 200 is a device used for input by a user. As described above, mainly supposed according to the embodiment of the present disclosure is the case where the pen-type device having the LED 210 (IR LED) installed at the distal end of the pen-type device is used. For example, the input device 200 has a mechanism in which the pen tip switch 220 is turned on and the LED 210 emits light, when the input device 200 is pressed against a screen by a user. The position (bright point) of light emission by the LED 210 is detected by the camera 300 and transmitted to the information processing device 100.

The output device 400 has a function of outputting a video (for example, a locus of the input device 200). Mainly supposed according to the embodiment of the present disclosure is a case where the projector 410 is included as the output device 400 and the projector 410 that is able to project a video on the screen where the user is making an input is used. However, without being limited to the projector 410, a TV 420 may be used, a tablet 430 may be used, a smartphone 440 may be used, or a personal computer (PC) 450 may be used, as the output device 400.

An example of the configuration of the information processing system 1 according to the embodiment of the present disclosure has been described above.

1.2. Details of Pairing Operation

Described next in detail is pairing operation by the information processing system 1 according to the embodiment of the present disclosure.

Figure 6:
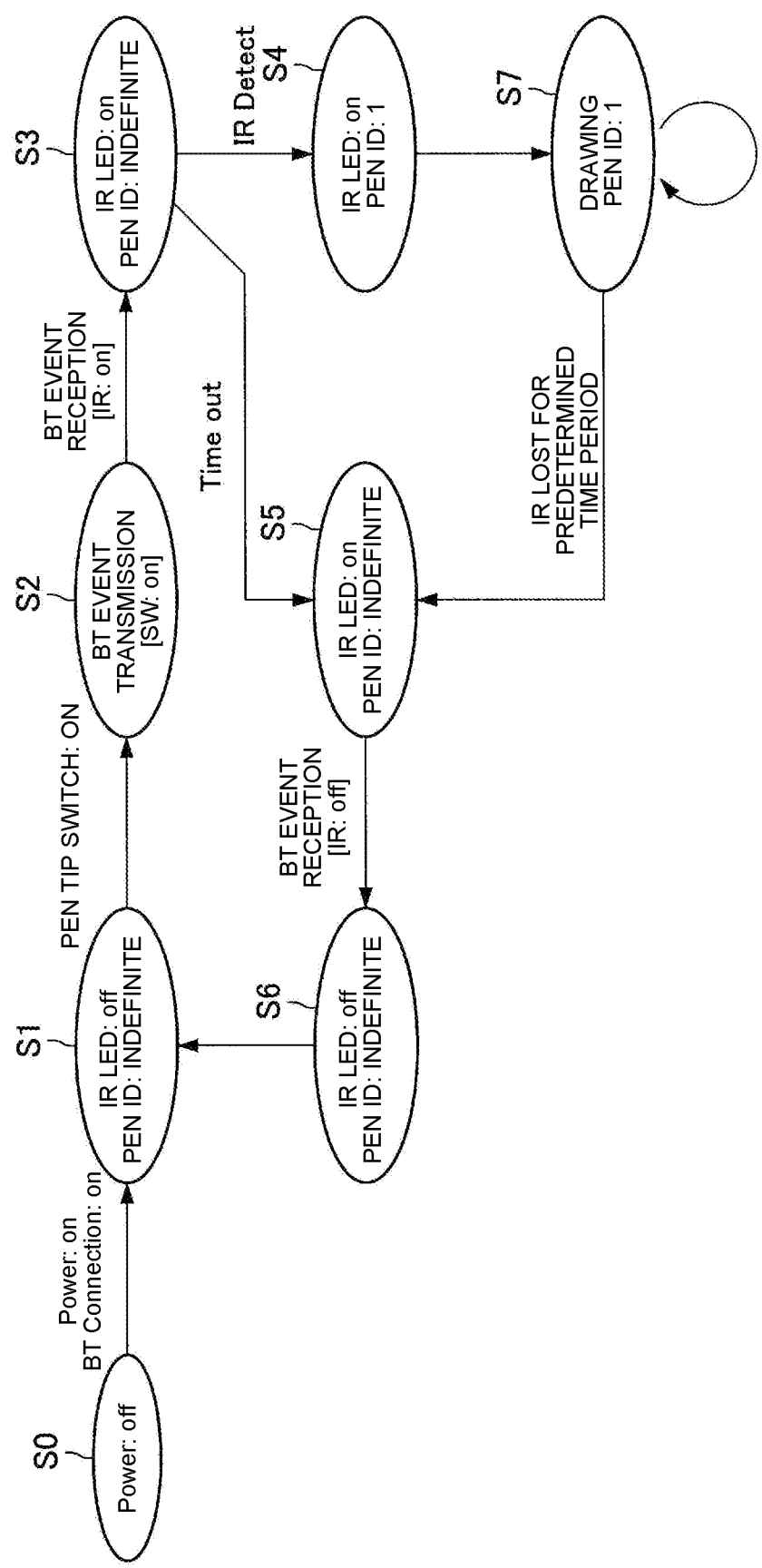
FIG. 6 is a state transition diagram for pairing operation by the information processing system according to the embodiment of the present disclosure.

FIG. 6 is a state transition diagram for the pairing operation by the information processing system 1 according to the embodiment of the present disclosure. As illustrated in FIG. 6, in an initial state where power of the information processing system 1 has been turned off (state S0), when the power of the information processing system 1 is turned on, BT connection between the information processing device 100 and the input device 200 (pen) is turned on. As a result, the IR LED is still off and the BT ID of the input device 200 (hereinafter, also referred to as the "pen ID") is still indefinite (state S1).

When writing with the input device 200 (pen) is started and the pen tip switch 220 is turned on in the input device 200 (pen) (if an on operation that is an example of a predetermined operation through the pen tip switch 220 has been detected), the CPU 230 performs control such that a BT event (an on-notification for the pen tip switch including the pen ID) is transmitted to the information processing device 100 via the communication module 240 (state S2). In the information processing device 100, if the BT event (including the pen ID) is received by the I/F unit 110, the light emission control unit 131 performs control such that a light emission instruction is output to the input device 200 (pen). In the input device 200 (pen), if the light emission instruction is input via the communication module 240, the CPU 230 causes the IR LED 210 to emit light. As a result, the IR LED is turned on but the pen ID of the input device 200 is still indefinite (state S3).

In the information processing device 100, the light emission recognition unit 123 attempts to acquire light emission position information indicating a position where light has been emitted by the IR LED 210 of the input device 200 (pen). For example, the light emission recognition unit 123 attempts to acquire light emission position information from an image captured by the camera 300. If light emission position information has been acquired by the light emission recognition unit 123, the processing unit 133 associates the light emission position information with the pen ID. On the contrary, if light emission position information has not been acquired by the light emission recognition unit 123, the processing unit 133 does not perform association between light emission position information and a pen ID.

The processing unit 133 associates light emission position information with a pen ID if the light emission position information has been acquired in a first time period since the output of the light emission instruction (IR detect). As a result, the IR LED continues to be on and the pen ID of the input device 200 is made definite (as "1" in the example illustrated in FIG. 6) (state S4). After the light emission position information has been associated with the pen ID, light emission position information sequentially recognized (a locus of the pen) is associated with the pen ID, and drawing is performed through projection of a video (the locus) at the light emission position by the projector 410 (state S7).

However, if time in which light emission position information is not acquired after the acquisition of the light emission position information continues for more than a fourth time period, the processing unit 133 performs control such that a light emission stop instruction is output to the input device 200 (pen). In the input device 200 (pen), if the light emission stop instruction is input via the communication module 240, the CPU 230 causes the IR LED 210 to stop emitting light. As a result, state transition from the state S7 to the state S5 is carried out.

On the contrary, if light emission position information is not acquired in the first time period from the output of the light emission instruction (Time out), the processing unit 133 does not perform association between light emission position information and a pen ID. As a result, the IR LED continues to be on and indefiniteness of the pen ID of the input device 200 is continued (state S5). If light emission position information is not acquired, the light emission control unit 131 performs control such that a light emission stop instruction is output to the input device 200 (pen). In the input device 200 (pen), if the light emission stop instruction is input via the communication module 240, the CPU 230 causes the IR LED 210 to stop emitting light. As a result, the IR LED is turned off and the pen ID of the input device 200 still remains indefinite (state S6 and state S1).

There may be a case where a plurality of the input devices 200 (pens) are present. In that case, a case where plural BT events (on-notifications for pen tip switches including pen IDs) are received in the information processing device 100 may also be supposed (state S2). In this case, the plural BT Events (on-notifications for the pen tip switches) are placed in a queue by the communication management unit 122 and processed in sequence.

For example, a case where a first input device and a second input device are present will be supposed. In this case, if second identification information (a pen ID of the second input device) has been received from the second input device different from the first input device in a second time period since reception of first identification information from the first input device, the light emission control unit 131 performs control such that a second light emission instruction is output to the second input device after the second time period elapses from the reception of the first identification information. A time point at which that second time period elapses from the reception of the first identification information may be an earlier one of: a time point at which first light emission position information is acquired; and a time point at which a first time period elapses from output of a first light emission instruction.

If second light emission position information indicating a position where light is emitted by a second light emission unit of the second input device (an IR LED 210 of the second input device) has been acquired in a third time period since the output of the second light emission instruction, the processing unit 133 associates the second light emission position information with the second identification information (the pen ID of the second input device). This third time period may be the same as the above mentioned first time period or may be different from the first time period.

Figures 7, 8:
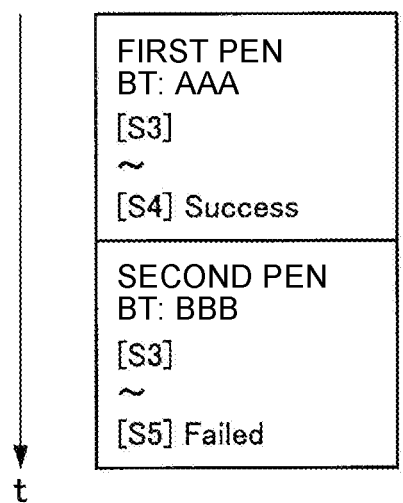
FIG. 7 is a diagram illustrating an example of a queue managed by a communication management unit.
FIG. 8 is a diagram illustrating an image of a queue executed in sequence.

FIG. 7 is a diagram illustrating an example of a queue managed by the communication management unit 122. As illustrated in FIG. 7, in the information processing device 100, BT events (on-notifications for pen tip switches) and BT events (off-notifications for pen tip switches) have been placed in a queue. A BT event (an on-notification for a pen tip switch) received from the pen ID, "AAA", corresponds to a first one in the queue and processing for that event has thus been "done". A BT event (an on-notification for a pen tip switch) received from the pen ID, "BBB", corresponds to a second one in the queue and processing for that event is thus "in progress".

FIG. 8 is a diagram illustrating an image of a queue executed in sequence. As illustrated in FIG. 8, processing for the pen ID, "AAA", corresponding to the first one in the queue is executed first and processing for the pen ID, "BBB", corresponding to a second one in the queue is executed thereafter. Furthermore, as illustrated in FIG. 7, processing for a third and later ones in the queue is "waiting".

1.3. Various Modified Examples

Described hereinafter are various modified examples applicable to the disclosed technique.

The case where infrared LEDs (the IR LEDs 210) are each used as an example of the light emission unit has been described above. However, the light emission unit is not limited to this example. For example, the light emission unit may be a visible LED. This visible LED may be a monochromatic LED, or a full-color LED.

Furthermore, the case where the pen tip switch 220 is used as an example of the detection unit has been described mainly above. However, the detection unit is not limited to this example. For example, the detection unit may include a pressure sensor, an electromagnetic induction sensor, or a capacitive sensor. For example, in a case where a pressure sensor is used as the detection unit, not only handwriting with a pen but also writing pressure with the pen may be acquired.

Furthermore, the case where the ID (pen ID) of the input device 200 is communicated according to Bluetooth (registered trademark) has been described mainly above. However, the ID (pen ID) of the input device 200 may be communicated by another communication method. For example, the ID (pen ID) of the input device 200 may be communicated by use of Wi-Fi (registered trademark), Zig-Bee (registered trademark), infrared communication, or ultrasonic communication.

Furthermore, the case where a camera is used as an imaging device has been described mainly above. However, a device other than a camera may be used as the imaging device. For example, a two-dimensional position sensitive device (PSD) may be used as the imaging device.

1.4. Effects

Described hereinafter are effects achieved by the disclosed technique.

Generally, for identification of each of plural pens, a hardware scheme for identification needs to be incorporated in each pen. In that case, because implementation of the individual pens needs to be changed, there is not only a disadvantage that the cost is increased but also a disadvantage that because there is a need for plural pens having different specifications to be purchased by plural users, in a case where the users bring and try to use their pens, if specifications of some of the pens coincide with one another, the pens are unable to be used by the plural users.

If the disclosed technique is used, pens having the same specifications are able to be used and identified, not only the production cost is reduced, but also constraints on specifications of pens are able to be eliminated even in a case where plural users bring and try to use their pens together. Furthermore, because there is no need for individual countermeasures hardware-wise, a finite number of pens are able to be identified in principle. Superiority of the disclosed technique is demonstrated also in a case where a large number of people (for example, tens of people) write on a large screen, like in a case where plural users perform writing in a school.

1.5. Example of Extended Function

Described hereinafter is an example of an extended function applicable to the disclosed technique. As described above, the case where bidirectional communication is possible between the input device 200 and the information processing device 100 has been supposed mainly. In that case, by feedback of state information on the input device 200 (pen) managed by the information processing device 100 to the input device 200 (pen), the input device 200 (pen) is able to present the state information on the input device 200 (pen) to a user.

More specifically, the light emission control unit 131 of the information processing device 100 may function as a presentation control unit that performs control such that presentation according to the state information on the input device 200 (pen) is executed by a non-illustrated presentation unit of the input device 200 (pen). A case where the non-illustrated presentation unit of the input device 200 (pen) is an LED for state presentation different from the IR LED 210 is supposed in this example, but the non-illustrated presentation unit of the input device 200 (pen) is not necessarily the LED for state presentation and may be a speaker or the like.

The state information is not particularly limited, but may be information indicating a pairing state. In this case, the state information may include at least one of: "before output of a light emission instruction" (that is, "indefinite state (S1)"); "after output of the light emission instruction and before acquisition of light emission position information" (that is, "detecting a bright point (S3)"); and a state where the light emission position information and the BT ID have been associated with each other (that is, "pairing completion state (S4)"). Furthermore, the state information may include "a case where time in which the light emission position information is not acquired has continued for more than a second time period" (that is, "input device's lost state (S6)").

Furthermore, the presentation according to the state information may be performed in any way. For example, if the presentation according to the state information is implemented by the LED for state presentation, the presentation according to the state information may be executed by use of blinking patterns of the LED for state presentation. Or, the presentation according to the state information may be executed by use of colors of the LED for state presentation.

FIG. 9 is a diagram illustrating an example of presentation of pairing states. FIG. 9 illustrates, as examples of the pairing states, "detecting a bright point (S3)", "pairing completion state (S4)", "input device's lost state (S6)", and "indefinite state (S1)". Furthermore, illustrated higher in FIG. 9 is a case where blinking patterns of the LED for state presentation are changed according to the pairing states.

Illustrated lower in FIG. 9, on the other hand, is a case where colors of the LED for state presentation are changed according to the pairing states. The blinking patterns and colors may be used alone or in combination.

Furthermore, for example, a user may be able to select information related to handwriting (for example, color, thickness, patchiness, and the like of the handwriting) through an application, for drawing by use of the input device 200 (pen). In this case, if light emission position information on the input device 200 (pen) is acquired, the processing unit 133 may associate the light emission position information; the BT ID; and the information related to handwriting with the input device 200 (pen), with one another. The state information may be the information related to handwriting, and the presentation according to the state information may be executed by use of the blinking patterns of the LED for state presentation or may be executed by use of the colors of the LED for state presentation.

Figure 10:
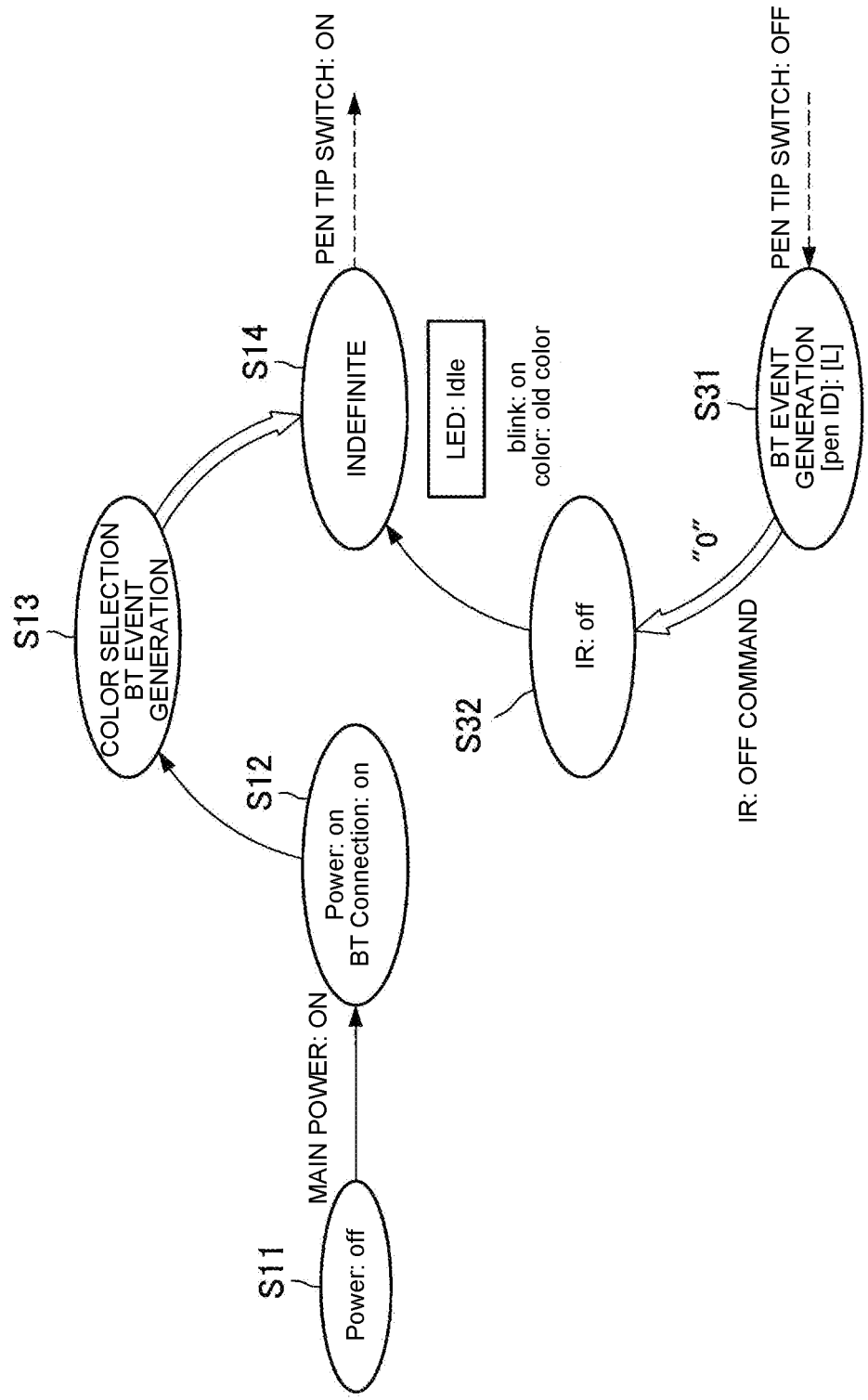
FIG. 10 is a diagram illustrating an example of presentation of information related to handwriting.
Figure 11:
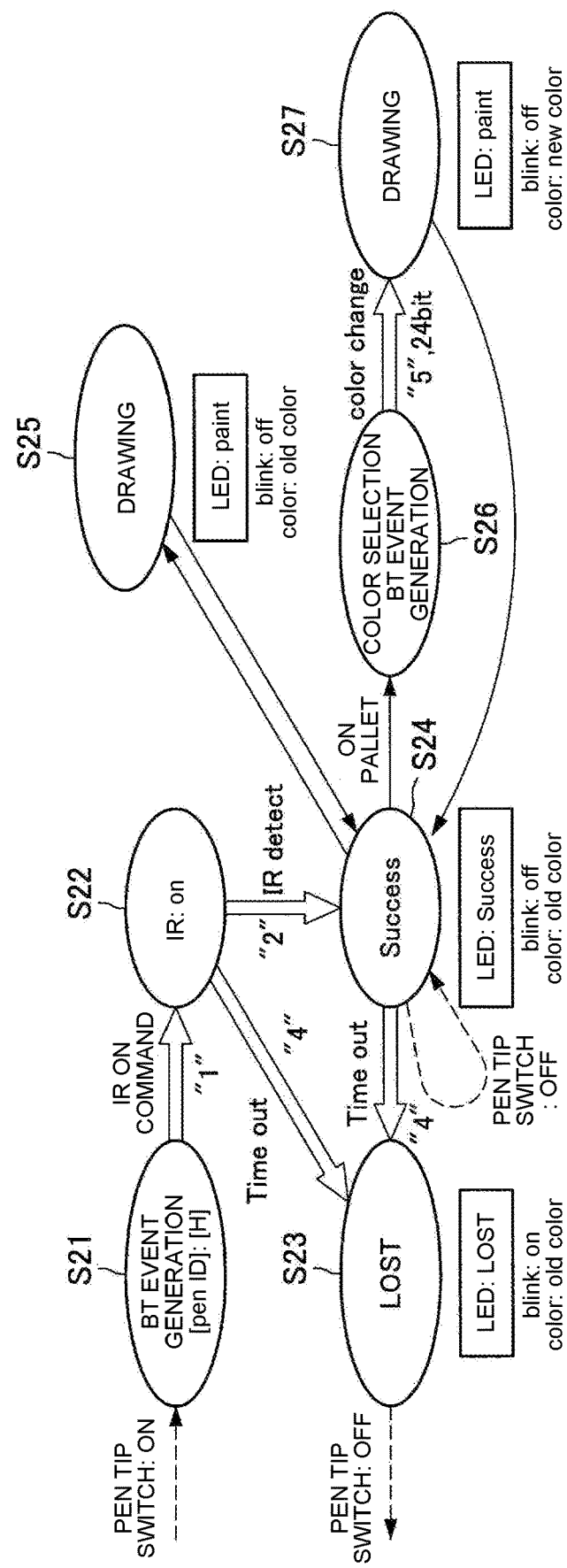
FIG. 11 is a diagram illustrating an example of presentation of information related to handwriting.

FIG. 10 and FIG. 11 are diagrams illustrating examples of the presentation of the information related to handwriting. FIG. 10 and FIG. 11 illustrate a case where the presentation of the information related to handwriting is executed by use of colors of the LED for state presentation. As represented by states S11 to S14, states S21 to S27, and states S31 to S32, when color selection is executed by the input device 200 (pen) on a pallet, color information is transmitted from the information processing device 100 to the input device 200 (pen) by a communication function according to BT, and when the color information is received by the input device 200 (pen), the LED for state representation is able to be caused to emit light, based on the received color information.

1-6. Application Examples

Described hereinafter are application examples of the disclosed technique. The disclosed technique is applicable to devices other than pens. That is, as long as a controller-type device having both a space coordinate detecting function and a communication function is usable in an arbitrary space, the device is able to be treated as an input device similarly to the pen described above, by pairing between three-dimensional coordinates of the device and an arbitrary communication connection.

Figure 12:
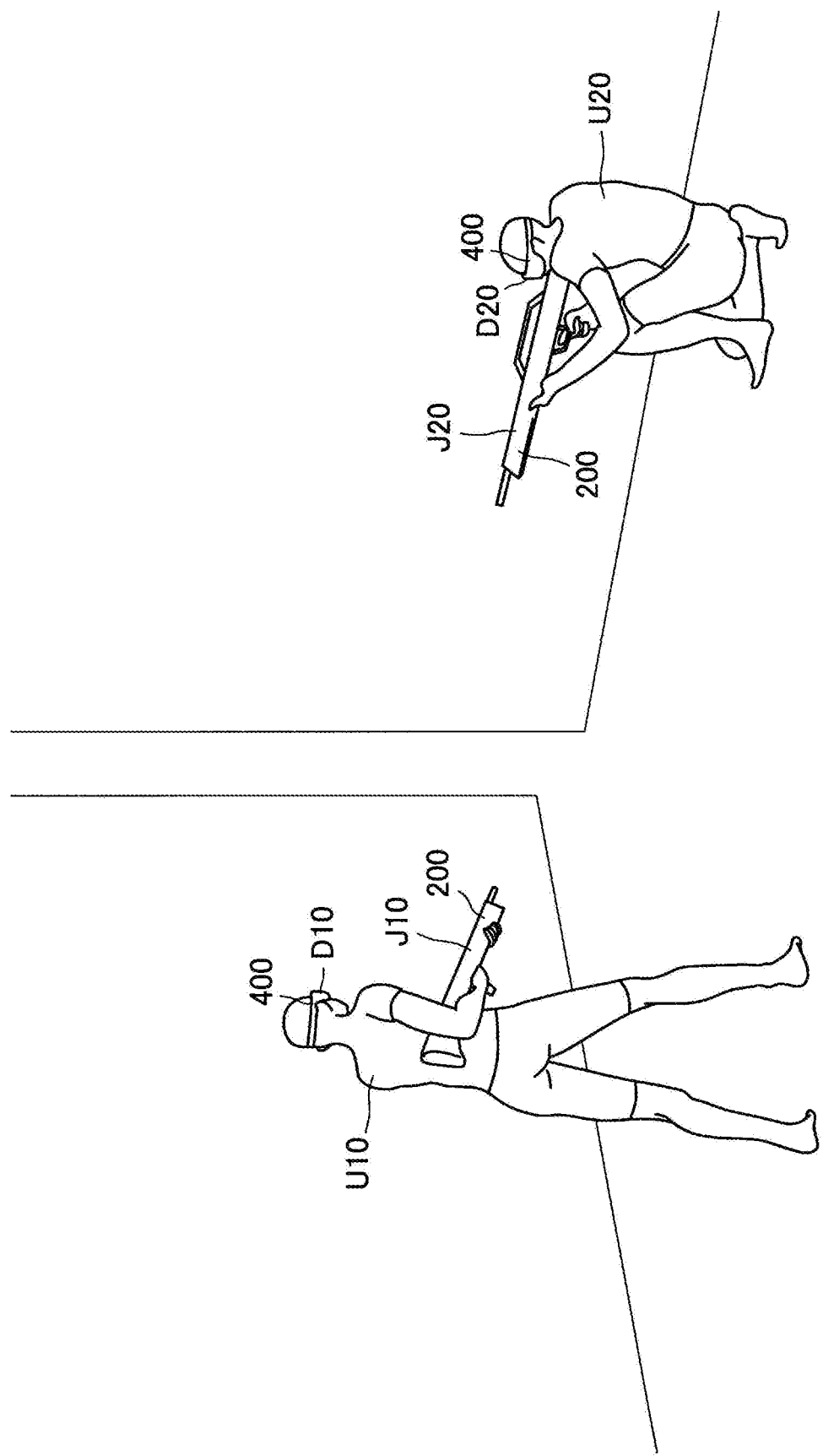
FIG. 12 is a diagram illustrating an application example of a technique disclosed herein.

FIG. 12 to FIG. 17 are diagrams illustrating application examples of the disclosed technique. In FIG. 12, a user U10 and a user U20 are playing a game. The user U10 is wearing a display D10 and holding a gun J10 that is an example of an AR/VR controller. Furthermore, the user U20 is wearing a display D20 and holding a gun J20 that is an example of the AR/VR controller. For example, by inclusion of an IR LED and a communication function like those that the above described input device 200 (pen) has in each of the gun J10 and gun J20, and provision of a camera for detecting the IR LEDs in their environment; the gun J10 and gun J20 are able to be identified.

Figure 13:
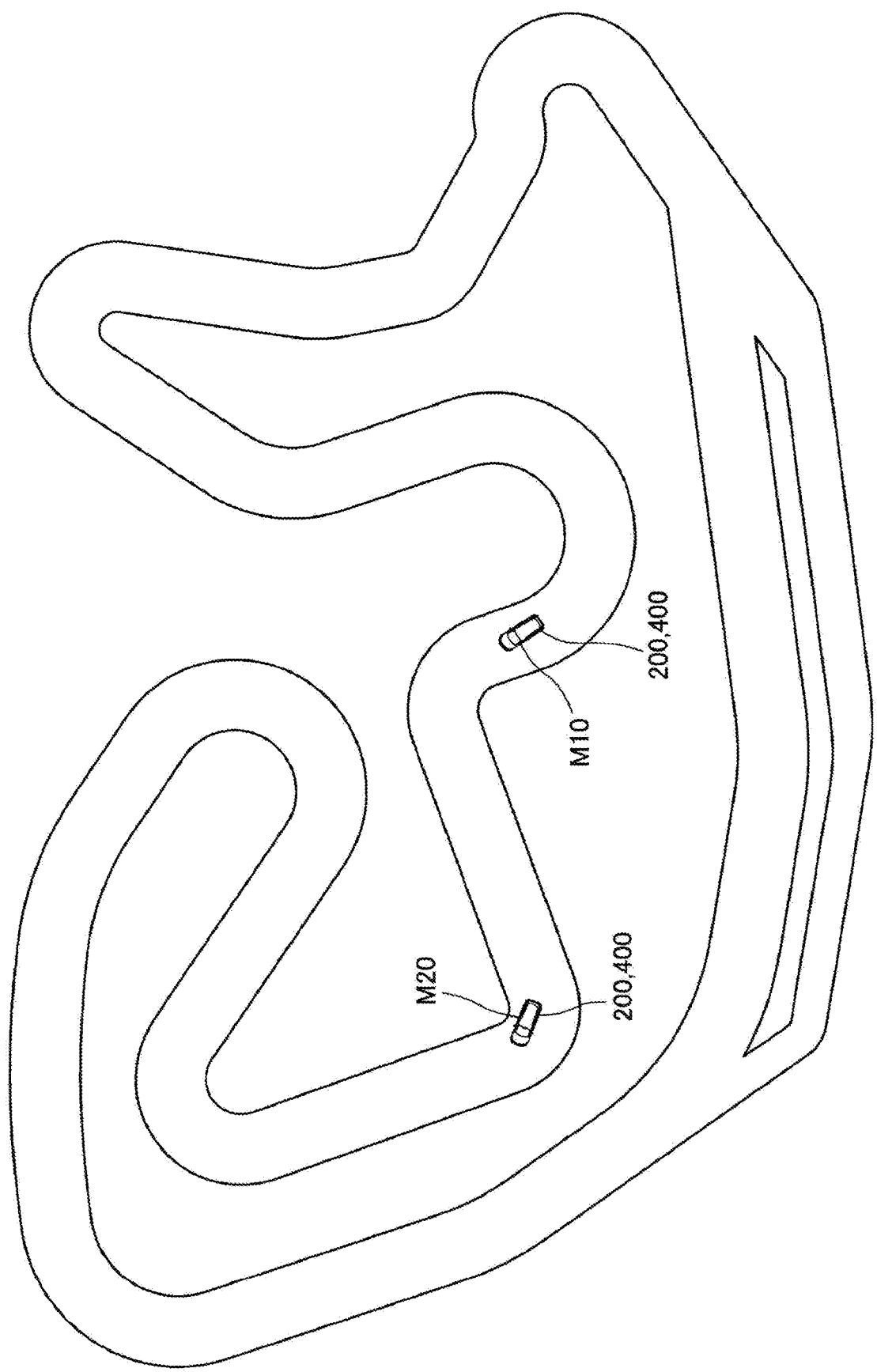
FIG. 13 is a diagram illustrating an application example of the disclosed technique.

In FIG. 13, an automobile M10 and an automobile M20 are running on a road. For example, by inclusion of an IR LED and a communication function like those that the above described input device 200 (pen) has in each of the automobile M10 and automobile M20, and provision of a camera for detecting the IR LEDs (for example, a camera that captures an image in a bird's-eye view of the road travelled by the automobiles) in their environment; the automobile M10 and automobile M20 are able to be identified. If a front projection projector (or an AR glass or the like) is installed in each of the automobile M10 and automobile M20, effects, such as attack effects on the opponent automobile and powering up effects, are able to be produced through videos displayed on the front projection projectors.

Figure 14:
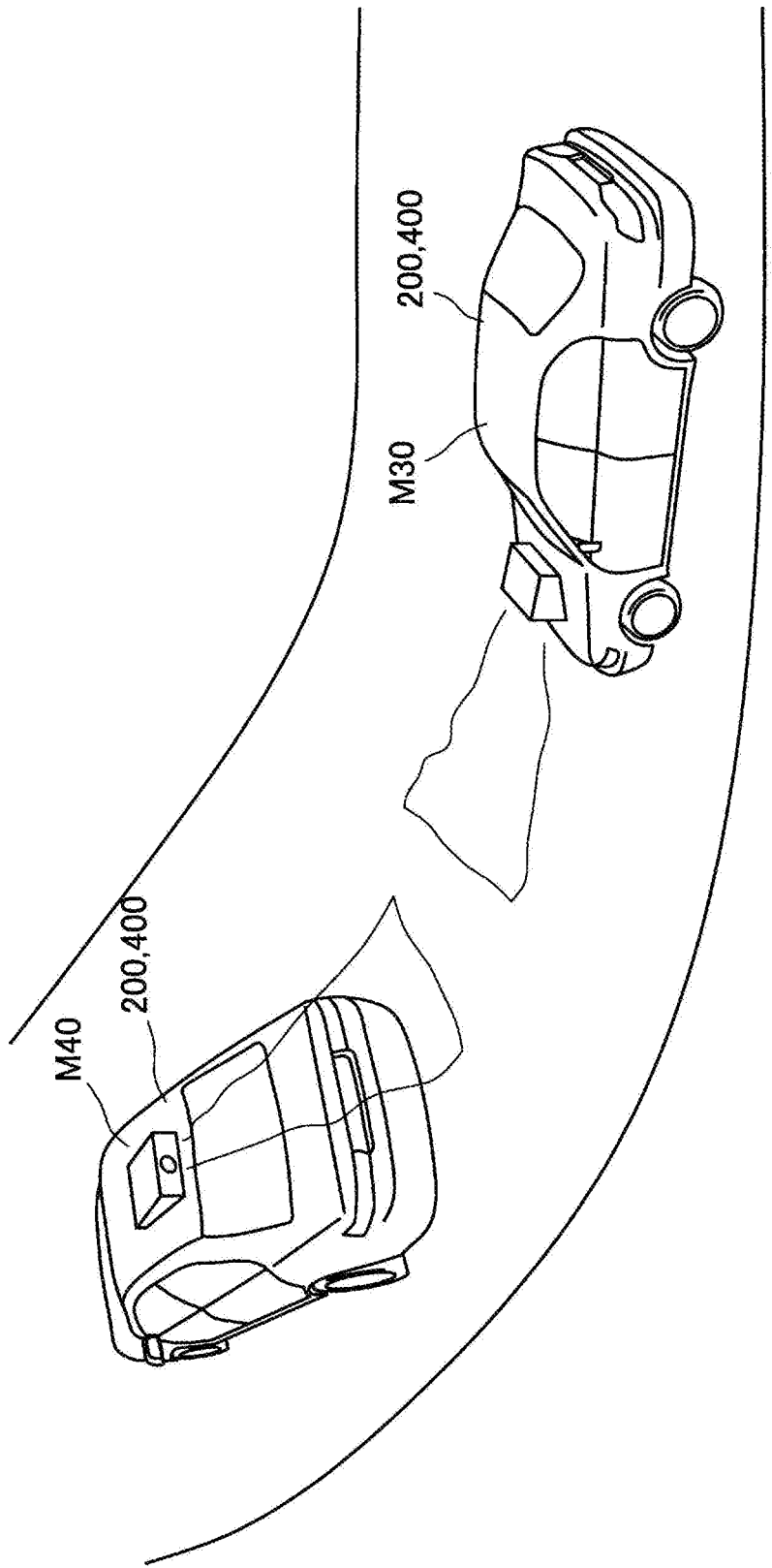
FIG. 14 is a diagram illustrating an application example of the disclosed technique.

In FIG. 14, an automobile M30 and an automobile M40 are running on a road. For example, by inclusion of an IR LED and a communication function like those that the above described input device 200 (pen) has in each of the automobile M30 and automobile M40, and provision of a camera for detecting the IR LEDs (for example, a camera that captures an image in a bird's-eye view of the road travelled by the automobiles) in their environment; the automobile M30 and automobile M40 are able to be identified. If a front projection projector (or an AR glass or the like) is installed in each of the automobile M30 and automobile M40; through videos displayed on the front projection projectors, videos of automobiles are able to be displayed and effects, such as attack effects and powering up effects, are able to be produced.

Figure 15:
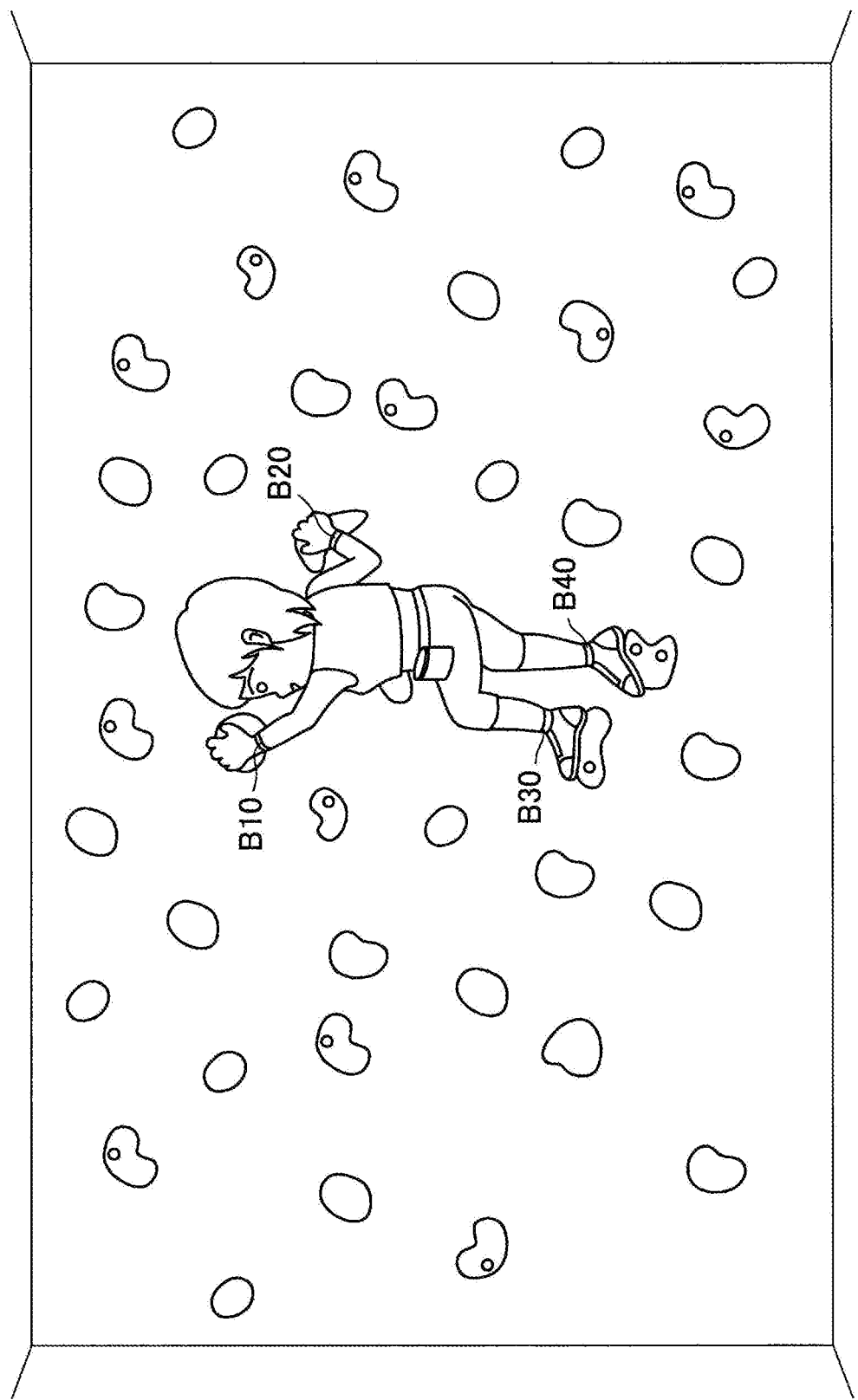
FIG. 15 is a diagram illustrating an application example of the disclosed technique.

In FIG. 15, a user is playing bouldering. For example, an effect disabling use of some of the holds may be caused by an effect related to a course background or a character. The information processing device 100 may recognize that a hold has been used through band-type controllers B10 to B40 (controllers that have been paired as described above) attached to the hands and feet, and may perform damage representation by presentation of tactile feedback to the user.

Figure 16:
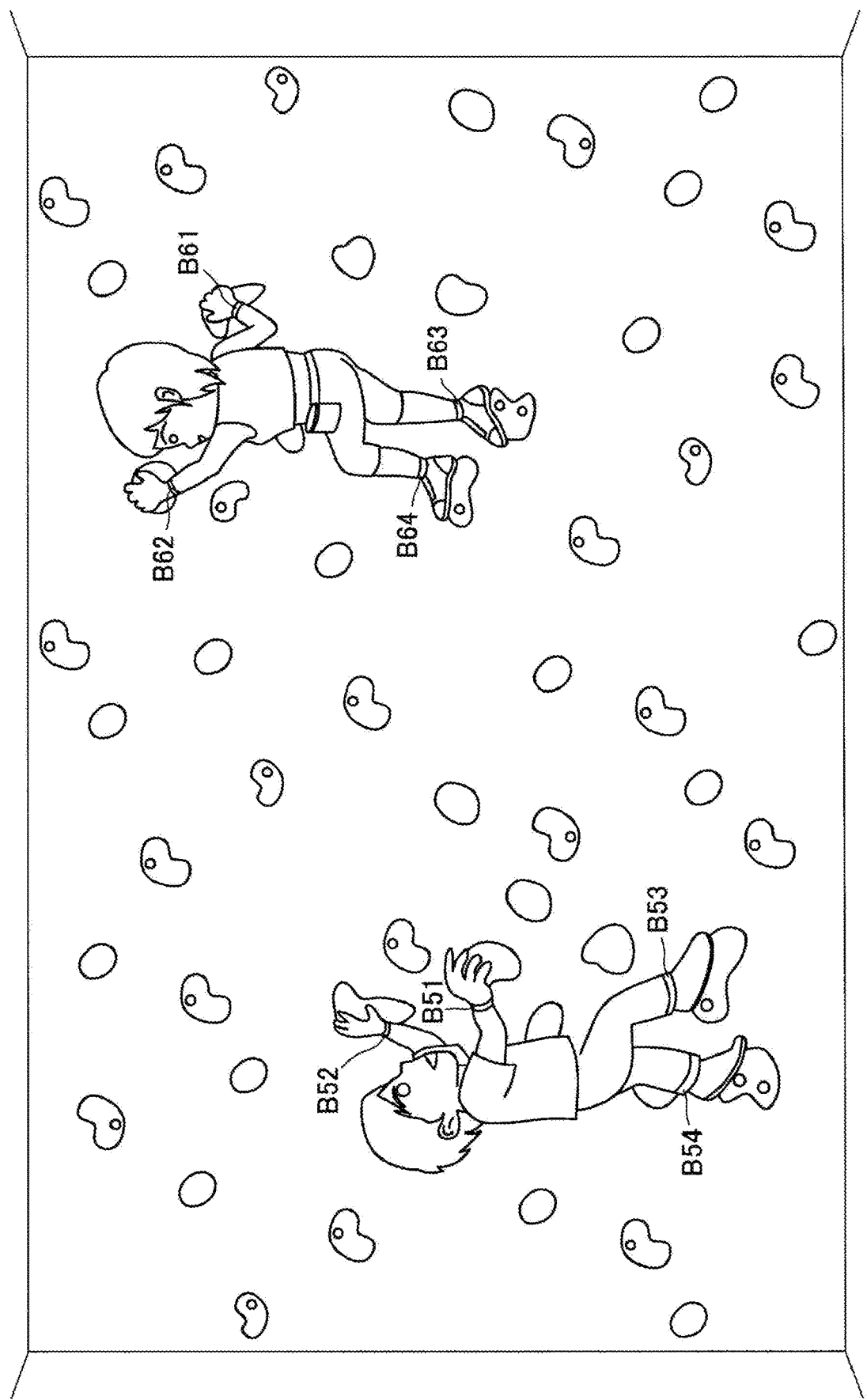
FIG. 16 is a diagram illustrating an application example of the disclosed technique.

Furthermore, in FIG. 16, plural users are playing bouldering. The information processing device 100 may identify the plural users and identify places climbed by the users like in a position taking game, through band-type controllers B51 to B54 and B61 to B64 (controllers that have been paired as described above) attached to hands and feet of the users. In this case, which one of the users has taken a position needs to be recognized and thus a total of four points corresponding to both hands and both feet need to be recognized as hands and legs of one user. Therefore, when pairing has been completed, which user's ID belongs to that combination of IDs of both hands and both legs is registered beforehand. For example, preparation of a GUI for selection of four points from IDs that have been paired and for registration of the four points as a user is supposed.

Figure 17:
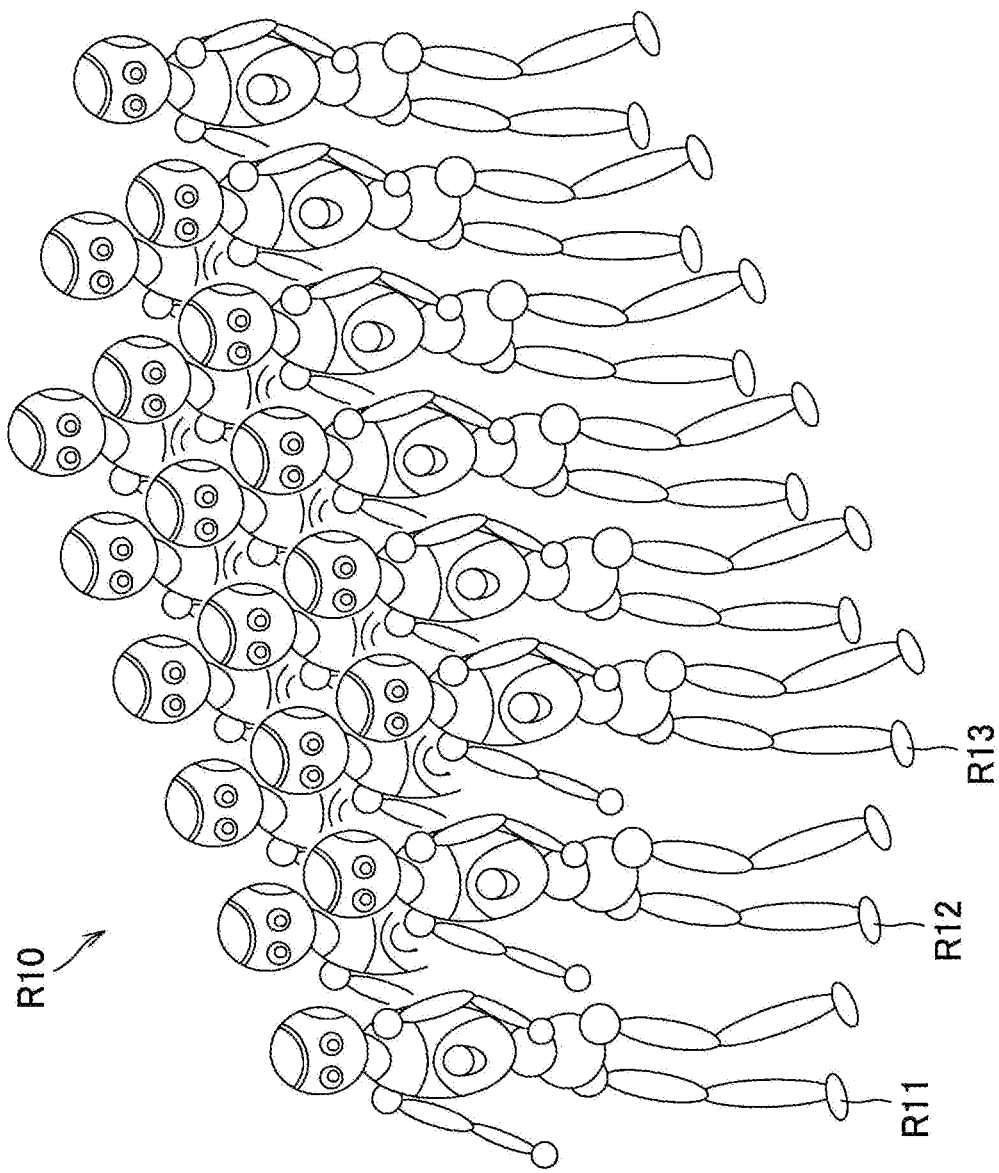
FIG. 17 is a diagram illustrating an application example of the disclosed technique.

In FIG. 17, a group R10 of plural individuals (individuals R11, R12, R13, and so on) are taking action as a group. The individuals may be robots as illustrated in FIG. 17, may be other devices, such as drones, or may be organisms, such as humans. For example, by inclusion of an IR LED and a communication function like those that the above described input device 200 (pen) has in each of the individuals forming the group R10 of individuals and provision of a camera for detecting the IR LEDs in their environment, the individuals forming the group R10 of individuals are able to be identified.

1.7. Example of Hardware Configuration

Figure 18:
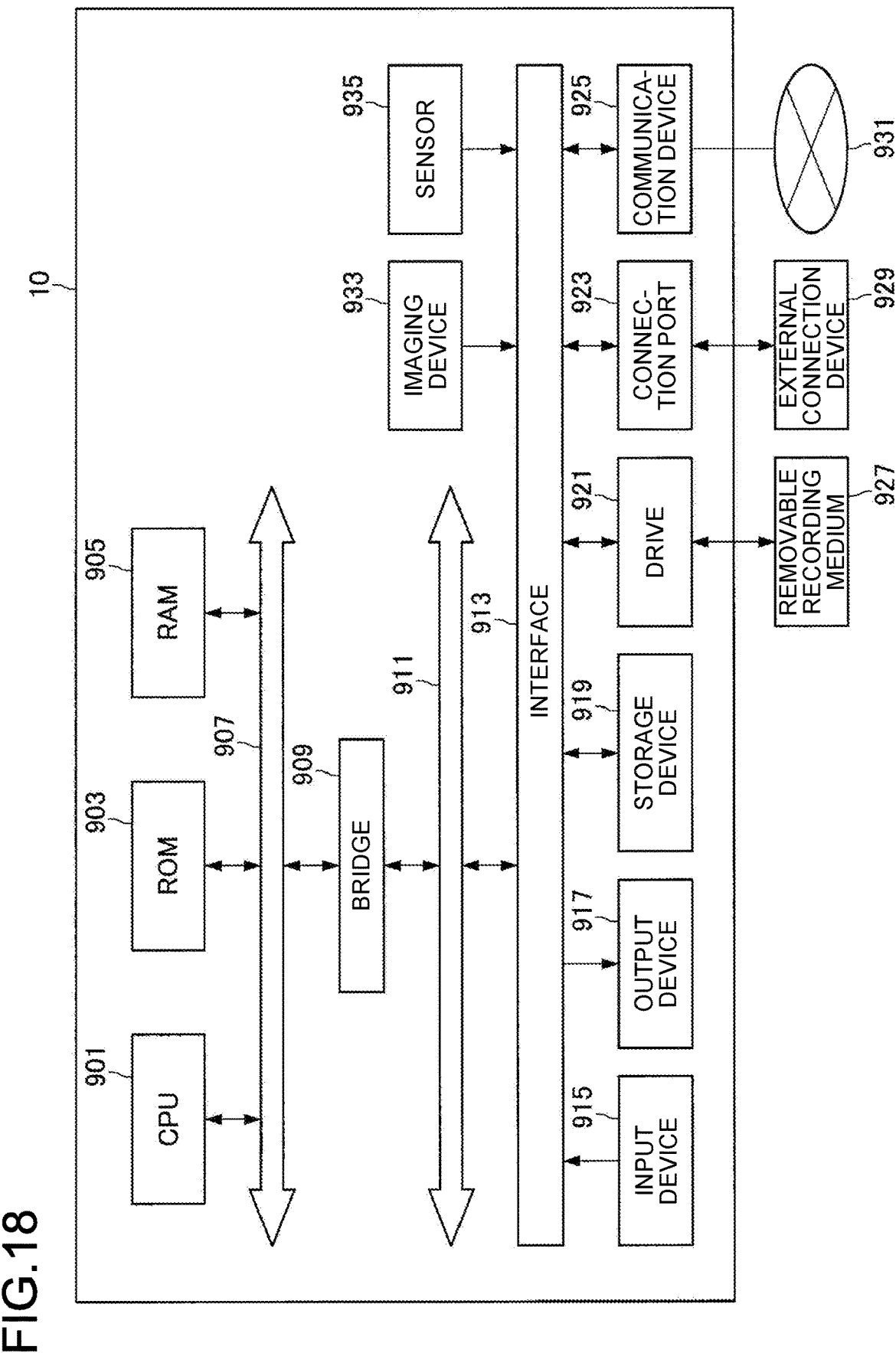
FIG. 18 is a block diagram illustrating an example of a hardware configuration of an information processing device according to the embodiment of the present disclosure.

Described next by reference to FIG. 18 is a hardware configuration of the information processing device 100 according to the embodiment of the present disclosure. FIG. 18 is a block diagram illustrating an example of the hardware configuration of the information processing device 100 according to the second embodiment of the present disclosure.

As illustrated in FIG. 18, the information processing device 100 includes a central processing unit (CPU) 801, a read only memory (ROM) 803, and a random access memory (RAM) 805. Furthermore, the information processing device 100 may include a host bus 807, a bridge 809, an external bus 811, an interface 813, a storage device 819, a drive 821, a connection port 823, and a communication device 825. The information processing device 100 may have a processing circuit called a digital signal processor (DSP) or an application specific integrated circuit (ASIC), instead of, or together with, the CPU 801.

The CPU 801 functions as an arithmetic processing device and a control device, and controls the overall operation or a part of the operation in the information processing device 100, according to various programs recorded in the ROM 803, the RAM 805, the storage device 819, or a removable recording medium 827. The ROM 803 stores therein a program, arithmetic parameters, and the like, which are used by the CPU 801. The RAM 805 temporarily stores therein a program used in execution by the CPU 801, parameters that change in the execution as appropriate, and the like. The CPU 801, ROM 803, and RAM 805 are connected to one another by a host bus 807 formed of an internal bus, such as a CPU bus. Furthermore, the host bus 807 is connected to the external bus 811, such as a peripheral component interconnect/interface (PCI) bus, via the bridge 809.

The storage device 819 is a device for data storage formed as an example of a storage unit of the information processing device 100. The storage device 819 is formed of, for example, a magnetic storage device, such as a hard disk drive (HHD), a semiconductor storage device, an optical storage device, or a magneto-optical storage device. This storage device 819 stores therein a program and various data executed by the CPU 801, various data acquired from outside, and the like.

The drive 821 is a reader-writer for the removable recording medium 827, such as a magnetic disk, an optical disk, a magneto-optical disk, or a semiconductor memory, and is built in or externally attached to the information processing device 100. The drive 821 reads information recorded in the removable recording medium 827 inserted in the drive 821, and outputs the information to the RAM 805. Furthermore, the drive 821 writes records into the removable recording medium 827 inserted in the drive 821.

The connection port 823 is a port for direct connection of a device to the information processing device 100. The connection port 823 may be, for example, a universal serial bus (USB) port, an IEEE 1394 port, or a small computer system interface (SCSI) port. Furthermore, the connection port 823 may be an RS-232C port, an optical audio terminal, a high-definition multimedia interface (HDMI) (registered trademark) port, or the like. By connection of an external connection device 829 to the connection port 823, various data are able to be exchanged between the information processing device 100 and the external connection device 829.

The communication device 825 is, for example, a communication interface formed of a communication device for connection to a network 931. The communication device 825 may be, for example, a communication card for a wired or wireless local area network (LAN), Bluetooth (registered trademark), or a wireless USB (WUSB). Furthermore, the communication device 825 may be a router for optical communication, a router for an asymmetric digital subscriber line (ADSL), a modem for any of various types of communication, or the like. For example, the communication device 825 transmits and receives signals by using a predetermined protocol, such as TCP/IP, to and from the Internet or another communication device. Furthermore, the network 931 connected to the communication device 825 is a network connected wiredly or wirelessly, and is, for example, the Internet, a home LAN, infrared communication, radio wave communication, or satellite communication.

2. CONCLUSION

As described above, provided according to the embodiment of the present disclosure is an information processing device including: a light emission control unit that performs control such that a first light emission instruction is output to a first input device if first identification information has been received from the first input device; and a processing unit that associates first light emission position information with the first identification information if the first light emission position information has been acquired, the first light emission position information indicating a position where light has been emitted by a first light emission unit of the first input device. Provided according to this configuration is a technique enabling reduction in cost and identification of input devices.

A preferred embodiment of the present disclosure has been described in detail above by reference to the appended drawings, but the technical scope of the present disclosure is not limited to this example. It is evident that a person having ordinary skill in the technical field of the present disclosure can derive various modified examples or corrected examples within the scope of the technical ideas written in the claims, and it is understood that these modified examples or corrected examples also rightfully belong to the technical scope of the present disclosure.

Furthermore, the effects described in this specification are just explanatory or exemplary, and are not limiting. That is, the technique according to the present disclosure may achieve other effects evident to those skilled in the art from the description in this specification, in addition to the above described effects or instead of the above described effects.

The following configurations also belong to the technical scope of the present disclosure.

(1)

An information processing device, comprising:

a light emission control unit that performs control such that a first light emission instruction is output to a first input device if first identification information has been received from the first input device; and a processing unit that associates first light emission position information indicating a position where light has been emitted by a first light emission unit of the first input device, with the first identification information, if the first light emission position information has been acquired.

(2)

The information processing device according to (1), wherein the processing unit associates the first light emission position information with the first identification information, if the first light emission position information has been acquired in a first time period since the output of the first light emission instruction.

(3)

The information processing device according to (2), wherein the light emission control unit performs control such that a light emission stop instruction is output to the first input device, if the first light emission position information has not been acquired in the first time period since the output of the first light emission instruction.

(4)

The information processing device according to (3), wherein the light emission control unit performs control such that a second light emission instruction is output to a second input device different from the first input device after a second time period elapses from the reception of the first identification information, if second identification information has been received from the second input device in the second time period since the reception of the first identification information.

(5)

The information processing device according to (4), wherein the processing unit associates second light emission position information with the second identification information, if the second light emission position information has been acquired in a third time period since the output of the second light emission instruction, the second light emission position information indicating a position where light has been emitted by a second light emission unit of the second input device.

(6)

The information processing device according to any one of (1) to (5), wherein the processing unit performs control such that a light emission stop instruction is output to the first input device, if time in which the first light emission position information is not acquired continues for more than a fourth time period after the acquisition of the first light emission position information.

(7)

The information processing device according to any one of (1) to (6), wherein the information processing device comprises a presentation control unit that performs control such that presentation according to state information on the first input device is executed by a presentation unit of the first input device.

(8)

The information processing device according to (7), wherein the state information includes at least one of: before the output of the first light emission instruction; after the output of the first light emission instruction and before the acquisition of the first light emission position information; and a state where the first light emission position information has been associated with the first identification information.

(9)

The information processing device according to (7) or (8), wherein the presentation is executed by use of a blinking pattern of an LED or a color of the LED.

(10)

The information processing device according to any one of (1) to (6), wherein the information processing device comprises a presentation control unit that performs control such that presentation according to information related to handwriting with the first input device is executed by a presentation unit of the first input device.

(11)

The information processing device according to any one of (1) to (10), wherein the processing unit associates the first light emission position information with the first identification information, if the first light emission position information has been acquired based on a captured image.

(12)

The information processing device according to any one of (1) to (11), wherein the first input device is a pen-type input device.

(13)

The information processing device according to any one of (1) to (12), wherein the processing unit associates the first light emission position information, the first identification information, and the information related to the handwriting with the first input device with one another, if the first light emission position information has been acquired.

(14)

The information processing device according to any one of (1) to (13), wherein the first light emission unit is an infrared LED or a visible LED.

(15)

The information processing device according to any one of (1) to (14), wherein the first identification information is transmitted from the first input device, if a predetermined operation has been detected by a detecting unit of the first input device.

(16)

The information processing device according to (15), wherein the detecting unit includes a switch, a pressure sensor, an electromagnetic induction sensor, or a capacitive sensor.

(17)

The information processing device according to any one of (1) to (16), wherein the first identification information is received from the first input device by use of Bluetooth (registered trademark), Wi-Fi (registered trademark), Zig-Bee (registered trademark), infrared communication, or ultrasonic communication.

(18)

An information processing method, including:
controlling such that a first light emission instruction is output to a first input device, if first identification information has been received from the first input device; and
associating, by using a processor, first light emission position information with the first identification information, if the first light emission position information has been acquired, the first light emission position information indicating a position where light has been emitted by a first light emission unit of the first input device.

(19)

An information processing system having an input device and an information processing device, wherein
the input device comprises a control unit that performs control of transmission of identification information,
the control unit performs control such that a light emission unit emits light if a light emission instruction has been received from the input device, and
the information processing device comprises:
a light emission control unit that performs control such that the light emission instruction is output, if the identification information has been received; and
a processing unit that associates light emission position information with the identification information, if the light emission position information has been acquired, the light emission position information indicating a position where light has been emitted by the light emission unit.

(20)

The information processing system according to (19), wherein
the information processing system has an imaging device, and
the processing unit associates the light emission position information with the identification information, if the light emission position information has been acquired based on an image captured by the imaging device.

REFERENCE SIGNS LIST

1 INFORMATION PROCESSING SYSTEM
100 INFORMATION PROCESSING DEVICE

110 I/F UNIT
121 ID MANAGEMENT UNIT
122 COMMUNICATION MANAGEMENT UNIT
123 LIGHT EMISSION RECOGNITION UNIT
124 COORDINATE CONVERSION UNIT
130 CONTROL UNIT
131 LIGHT EMISSION CONTROL UNIT
132 COMMUNICATION CONTROL UNIT
133 PROCESSING UNIT
140 STORAGE UNIT
210 LED
220 PEN TIP SWITCH
230 CPU
240 COMMUNICATION MODULE
300 CAMERA
400 OUTPUT DEVICE
410 PROJECTOR
430 TABLET
440 SMARTPHONE

The invention claimed is:

1. An information processing device, comprising:
a light emission control unit configured to perform control such that a first light emission instruction is output to a first input device if first identification information has been received from the first input device;
a processing unit configured to associate first light emission position information indicating a position where light has been emitted by a first light emission unit of the first input device, with the first identification information, if the first light emission position information has been acquired; and
a presentation control unit configured to perform control of a presentation according to state information on the first input device,
wherein the presentation is different from the light emitted by the first light emission unit,
wherein the state information is based on a state of bidirectional communication between the first input device and the information processing device, and
wherein the light emission control unit, the processing unit, and the presentation control unit are each implemented via at least one processor.

2. The information processing device according to claim 1, wherein the processing unit associates the first light emission position information with the first identification information, if the first light emission position information has been acquired in a first time period since the output of the first light emission instruction.

3. The information processing device according to claim 2, wherein the light emission control unit performs control such that a light emission stop instruction is output to the first input device, if the first light emission position information has not been acquired in the first time period since the output of the first light emission instruction.

4. The information processing device according to claim 3, wherein the light emission control unit performs control such that a second light emission instruction is output to a second input device different from the first input device after a second time period elapses from the reception of the first identification information, if second identification information has been received from the second input device in the second time period since the reception of the first identification information.

5. The information processing device according to claim 4, wherein the processing unit associates second light emission position information with the second identification information, if the second light emission position information has been acquired in a third time period since the output of the second light emission instruction, the second light emission position information indicating a position where light has been emitted by a second light emission unit of the second input device.

6. The information processing device according to claim 1, wherein the processing unit performs control such that a light emission stop instruction is output to the first input device, if time in which the first light emission position information is not acquired continues for more than a fourth time period after the acquisition of the first light emission position information.

7. The information processing device according to claim 1, wherein the presentation control unit performs control such that the presentation according to the state information on the first input device is executed by a presentation unit of the first input device,
wherein the presentation control unit is implemented via at least one processor.

8. The information processing device according to claim 7, wherein the state of bidirectional communication is selected from a group consisting of:
before the output of the first light emission instruction;
after the output of the first light emission instruction and before the acquisition of the first light emission position information; and
a state where the first light emission position information has been associated with the first identification information.

9. The information processing device according to claim 7, wherein the presentation is executed by use of a blinking pattern of an LED or a color of the LED.

10. The information processing device according to claim 1, further comprising:
a presentation control unit configured to perform control such that presentation according to information related to handwriting with the first input device is executed by a presentation unit of the first input device,
wherein the presentation control unit is implemented via at least one processor.

11. The information processing device according to claim 1, wherein the processing unit associates the first light emission position information with the first identification information, if the first light emission position information has been acquired based on a captured image.

12. The information processing device according to claim 1, wherein the first input device is a pen-type input device.

13. The information processing device according to claim 1, wherein the processing unit associates the first light emission position information, the first identification information, and the information related to the handwriting with the first input device with one another, if the first light emission position information has been acquired.

14. The information processing device according to claim 1, wherein the first light emission unit is an infrared LED or a visible LED.

15. The information processing device according to claim 1, wherein the first identification information is transmitted from the first input device, if a predetermined operation has been detected by a detecting unit of the first input device.

16. The information processing device according to claim 15, wherein the detecting unit includes a switch, a pressure sensor, an electromagnetic induction sensor, or a capacitive sensor.

17. The information processing device according to claim 1, wherein the first identification information is received from the first input device by use of Bluetooth (registered trademark), Wi-Fi (registered trademark), ZigBee (registered trademark), infrared communication, or ultrasonic communication.

18. An information processing method, including:
    controlling such that a first light emission instruction is output to a first input device, if first identification information has been received from the first input device;
    associating, by using a processor, first light emission position information with the first identification information, if the first light emission position information has been acquired, the first light emission position information indicating a position where light has been emitted by a first light emission unit of the first input device; and
    controlling a presentation according to state information on the first input device,
    wherein the presentation is different from the light emitted by the first light emission unit, and
    wherein the state information is based on a state of bidirectional communication between the first input device and the information processing device.

19. An information processing system having an input device and an information processing device,
    wherein the input device comprises a control unit configured to perform control of transmission of identification information,
    wherein the control unit performs the control such that a light emission unit emits light if a light emission instruction has been received from the input device, and
    wherein the information processing device comprises:
        a light emission control unit configured to perform control such that the light emission instruction is output, if the identification information has been received;
        a processing unit configured to associate light emission position information with the identification information, if the light emission position information has been acquired, the light emission position information indicating a position where light has been emitted by the light emission unit; and
        a presentation control unit configured to perform control of a presentation according to state information on the input device,
    wherein the presentation is different from the light emitted by the light emission unit, and
    wherein the state information is based on a state of bidirectional communication between the input device and the information processing device.

20. The information processing system according to claim 19, wherein
    the information processing system has an imaging device, and
    the processing unit associates the light emission position information with the identification information, if the light emission position information has been acquired based on an image captured by the imaging device.

* * * * *